United States Patent [19]
Carter

[11] Patent Number: 6,034,764
[45] Date of Patent: Mar. 7, 2000

[54] PORTABLE ELECTRONIC DISTANCE AND VERTICAL ANGLE INSTRUMENT

[76] Inventor: Robert J. Carter, 2804 Oak Tree Dr., Fremont Hills, Mo. 65714

[21] Appl. No.: 08/821,737

[22] Filed: Mar. 19, 1997

Related U.S. Application Data

[60] Provisional application No. 60/013,749, Mar. 20, 1996.

[51] Int. Cl.[7] .................. G01C 3/00; G01C 3/08; G01B 11/26; B60T 7/16
[52] U.S. Cl. .................. 356/141.1; 180/169; 356/3.01; 356/4.01
[58] Field of Search .................. 180/169; 356/141.1, 356/5.01–5.15, 4.01, 3.01–3.14

[56] References Cited

U.S. PATENT DOCUMENTS

| | | | |
|---|---|---|---|
| Re. 29,025 | 11/1976 | Hansen | 356/138 |
| 2,893,134 | 7/1959 | Shea et al. | 33/206 |
| 3,993,407 | 11/1976 | Moricca et al. | |
| 4,108,539 | 8/1978 | Gort et al. | 350/201 |
| 4,113,381 | 9/1978 | Epstein | 356/5 |
| 4,149,321 | 4/1979 | Kivioja | 33/292 |
| 4,150,376 | 4/1979 | Blythe et al. | 343/7.7 |
| 4,379,367 | 4/1983 | Legris | 33/367 |
| 4,477,184 | 10/1984 | Endo | |
| 4,677,595 | 6/1987 | Obayaashi et al. | 367/13 |
| 4,790,402 | 12/1988 | Field et al. | 180/169 |
| 4,837,717 | 6/1989 | Wiklund et al. | 364/563 |
| 5,029,251 | 7/1991 | Sundberg | 250/231.1 |
| 5,055,666 | 10/1991 | Miyahara | 250/206.1 |
| 5,272,517 | 12/1993 | Tokura | 356/375 |
| 5,329,358 | 7/1994 | Horijon | 356/375 |
| 5,341,186 | 8/1994 | Kato | 354/403 |
| 5,373,344 | 12/1994 | Kakiuchi | 354/403 |
| 5,388,048 | 2/1995 | Yavnayi et al. | 364/461 |
| 5,392,110 | 2/1995 | Yojima et al. | 356/1 |
| 5,392,111 | 2/1995 | Nakamura | 356/139.1 |
| 5,530,514 | 6/1996 | Lisson et al. | 354/407 |

OTHER PUBLICATIONS

R.W. Kiefer et al., "Remote Sensing," appearing in The Engineering Handbook, R.C. Dorf, ed., (CRC Press, Inc.1995), pp. 1614–1619.

Close–Range Photogrammetry & Surveying: State of the Art, edited and published as Proceedings of the American Society of Photogrammetry, 1984 Fall Convention, pp. 55 and 62–67.

S.K. Ghosh, Analytical Photogrammetry, (Pergamon Press 1979), pp. 21–22.

Edmund Scientific's Industrial Optics Division's "1997 Optics and Optical Instruments Catalog," (Barrington, NJ 1996), p. 19.

*Primary Examiner*—Stephen C. Buczinski
*Attorney, Agent, or Firm*—Jonathan A. Bay

[57] ABSTRACT

A portable instrument combines an electronic distance or range finder with an electronic difference finder for vertical (i.e., elevational) angle mensuration in order to at least to determine or compute, from a remote distance away, a vertical clearance between a bridge overpass and an under-passing highway. The instrument is at least sighted manually on one of a bridge overpass or the under-passing highway, but instantaneously gives computed values once activated.

5 Claims, 5 Drawing Sheets

PORTABLE ELECTRONIC DISTANCE AND VERTICAL ANGLE INSTRUMENT

CROSS-REFERENCE TO PROVISIONAL APPLICATION

This application claims the benefit of U.S. Provisional Application Ser. No. 60/013,749, filed Mar. 20, 1996.

BACKGROUND AND SUMMARY OF THE INVENTION

The invention relates to a geometrical or optical measuring instrument, and more particularly to a portable instrument which combines an electronic distance or range finder with an electronic difference finder for vertical (i.e., elevational) angle mensuration.

It is an object of the invention to provide an apparatus that can determine a vertical clearance between a bridge overpass and an under-passing highway from a remote distance away.

It is an alternate object of the invention that the above apparatus be portable in the sense that it can be mounted to and operated from a vehicle, or else in some versions of the invention be handheld.

It is another object of the invention that the above invention be sighted manually on at least one of the bridge overpass or the under-passing highway, but otherwise instantaneously give computed values after switched ON or the like.

A number of additional features and objects will be apparent in connection with the following discussion of preferred embodiments and examples.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the scope of the appended claims. In the drawings.

DETAILED DESCRIPTION OF THE INVENTION

Figure 1:
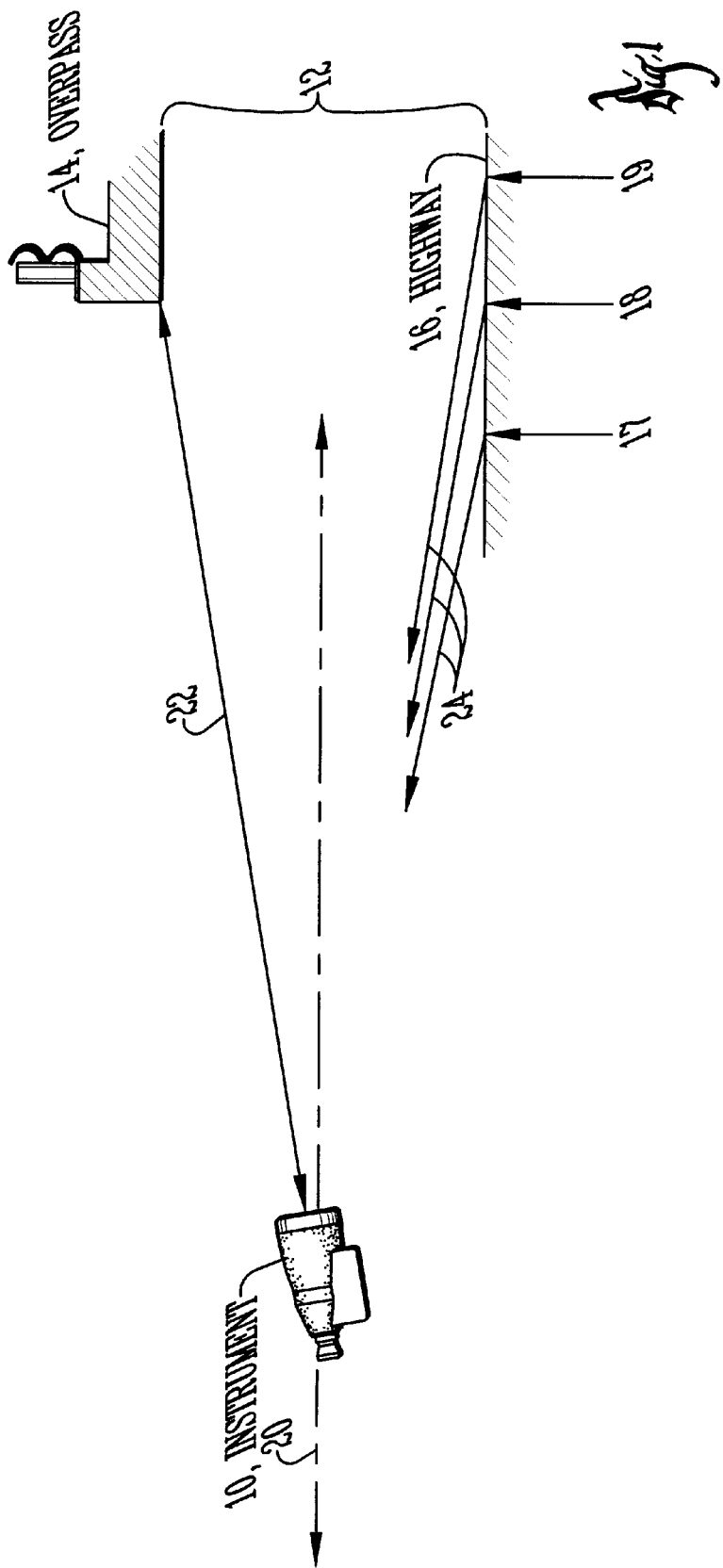
FIG. 1 is a diagrammatic view of a portable electronic distance and vertical angle instrument in accordance with the invention, which includes depiction of a primary optical axis extending between the instrument and a bridge overpass, as well as a secondary optical axis alternately intersecting an under-passing highway at three spaced points.

FIG. 1 shows a portable (e.g., in this version, handheld) instrument 10 in accordance with the invention in which is combined an electronic distance or range finder with a difference finder for vertical (or elevational) angles. FIG. 1 also shows one use of the instrument 10: which is, namely, determining a vertical clearance 12 between a bridge overpass 14 and an under-passing highway 16 from a remote distance away.

Briefly, this version of the instrument 10 is handheld and has an overall look and feel comparable to binoculars. Like binoculars, the handheld instrument 10 includes an eyeglass (not shown) that allows a user to aim the instrument at a primary target, such as the bridge overpass. The instrument 10 is capable of measuring the distance between itself and the primary target (i.e., the bridge overpass). The instrument 10 includes an adjustable optical cross-hair, described below, to align on a second target, which in FIG. 1 is shown variously as three spaced points 17–19. The instrument is tilted relative to a horizontal plane, which is indicated by datum line 20. In use, the instrument 10 is capable of measuring and/or calculating, the distance between itself and the primary target 14, the angle subtended between the of primary and secondary targets 14 and 18, and the angle between the primary axis 22 and horizontal datum 20. Given the foregoing two angles and one distance, the instrument is further able to compute the vertical clearance 12.

The instrument is sensitive to error introduced when the secondary axis 24 is aligned on the wrong spot on the under-passing the highway 16. The correct spot is indicated by point 18. The point indicated by numeral 17 is too near and will give a computed vertical clearance which is lesser than the actual vertical clearance 12. Conversely, the point indicated by numeral 19 is too far and will give a computed vertical clearance which is greater than the actual vertical clearance 12. The terms "primary" and "secondary" are used merely for convenience in this description and do not limit the invention to favoring or subordinating the data or information which is associated with one optical axis 22 or 24 to the data or information associated with the other.

Figure 2:
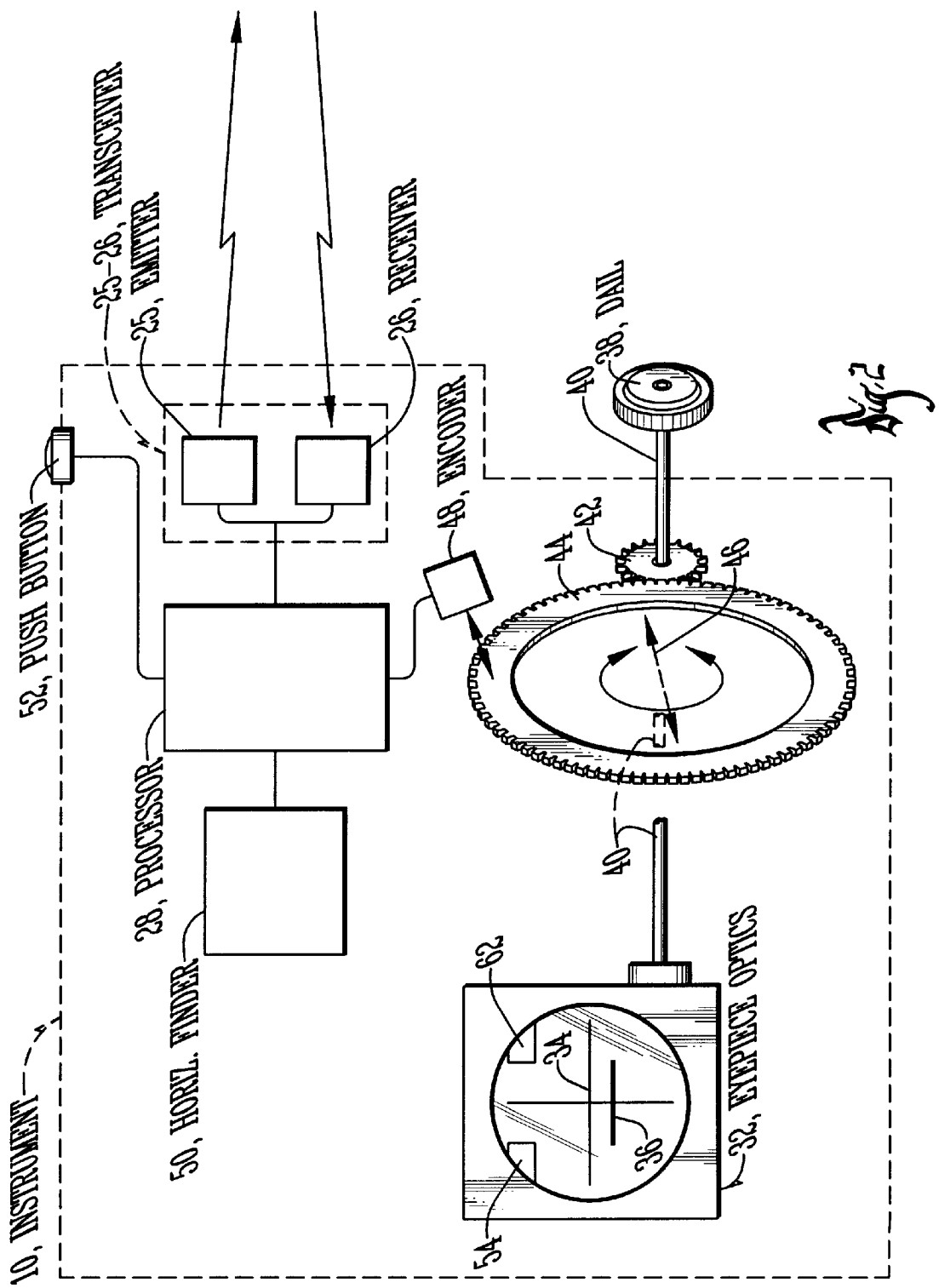
FIG. 2 is a partial schematic circuit diagram of the instrument in accordance with the invention.

With reference to FIG. 2, the instrument 10 includes electronic distance finding circuitry as is known in the art and is commercially available in a product, for example, of the Bushnell Corporation, from Overland Park, Kans., which product is given the brandname "LYTESPEED 400 (TM)." Briefly, electronic distance finding circuitry includes an infrared signal transceiver 25-26 that has a pulse emitter 25 and a signal receiver 26. The pulse emitter sends infrared pulses to a target, which, as this instrument is configured, is the primary target 14. A given target usually reflects some fraction of the infrared signal back to the instrument 10, where the reflected signal is received by the receiver 26. Processing circuitry 28 determines a round-trip time for a given pulse to travel from the emitter 25, to the target 14, and back.

Various methods exist for effectively "clocking" the round trip time. By one popular method, round trip time is not so much as clocked as computed from modulating the reflected signal with the transmit signal. Several frequencies result. Generally the sum frequency is ignored but the beat frequency is correlatable to elapsed or round trip time. Other methods and many would be suitable for use in the invention. An example range finding apparatus and method is disclosed by U.S. Pat. No. 5,388,048—Yavnayi et al., the disclosure of which is incorporated herein by this reference thereto. Round-trip time is correlated to distance or range. In FIG. 1, the computed distance is shown as the distance between the instrument 10 and the bridge overpass 14.

Returning to FIG. 2, the instrument 10 includes an eyepiece 30 that has optics 32 with a reticle 34 that defines a viewing axis. The viewing axis is substantially aligned with the path traveled by the infrared signal. This viewing axis is shown in FIG. 1 as the primary axis 22. The eyepiece optics 32 (FIG. 2) include an adjustable cross hair 36 which is manually adjustable by a dial 38, as preferably turned by the user's thumb or the like. The dial is connected to the eyepiece optics by an axle 40. The axle 40 has attached to it between the dial and eyepiece optics a wheel 42 frictionally engaging a rim of a reflective ring 44. The ring 44 is rotatably mounted on a bracket (not shown) to rotate about central axis 46. An optical encoder 48 gives the processing circuitry 28 a signal which relates the relative rotation of the reflective ring 44. In use, the user dials the dial until the adjustable cross-hair 36 aligns on the secondary target 18.

The instrument 10 further includes an electronic finder or transducer 50 of the horizontal plane. Such electronic finders can include sensor circuitry interacting with a pendulum, or a mercury-containing vial or vials which give(s) a changed resistance owing to the degree of tilt away from the horizontal, and the like. The U.S. Pat. No. 5,029,251—Sundberg, discloses a pendulum type transducer which gives an output signal correlatable to the horizontal datum. Alternatively, U.S. Pat. No. 4,149,321—Kivioja, discloses such a transducer which incorporates a free mercury surface as a mirror to gauge the horizontal datum, from which is gained relatively greater precision and consistency if compared to hanging pendulums perhaps impeded by friction or to mercury vials perhaps impeded by surface tension. The disclosures of the foregoing patent references are fully incorporated herein by this reference to them here.

Figure 3:
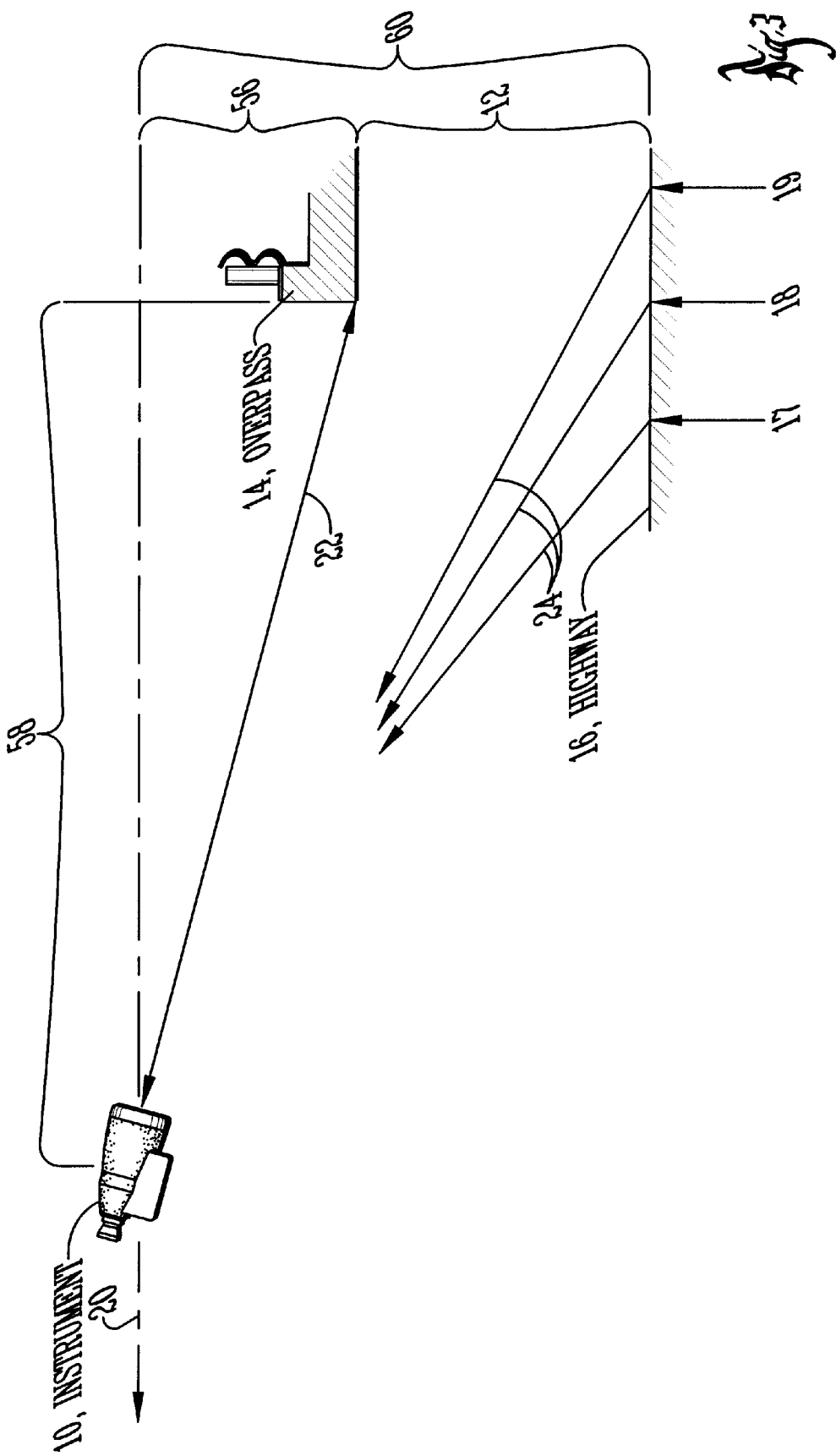
FIG. 3 is a view comparable to FIG. 1 except showing the instrument in a changed position.

With general reference to FIGS. 2 and 3, use of the instrument 10 preferably occurs as follows. The reticle 34 is aimed at the primary target, i.e., the lower edge of the bridge overpass 14. The adjustable cross-hair 36 is aligned on the secondary target 18 which, in FIG. 3, is preferably that portion of the under-passing highway 16 that lies in the same vertical plane as the vertical face of the bridge overpass 14. The preferred point is indicated by numeral 18. The point 17 is too near, and the point 19 is too far. Aligning the cross-hair 36 either way too near or too far of the preferred point 18 will introduce error into the computed result. Once aligned, the user depresses a push-button 52 which concurrently activates signal processing of the signals from the infrared transceiver circuitry 25-26, the encoding optics 48 aimed at the reflective ring 44, and the electronic finder 50 of the horizontal plane.

The infrared transceiver circuitry 25-26 gives a signal which corresponds to the distance between the instrument 10 and the primary target 14. This distance is indicated by a visual display 54 in the eyepieces optics 32. The encoding optics 48 give a signal which corresponds to the angle between the primary and secondary targets 14 and 18. The horizontal datum finder 50 allows determination of the angle between the primary axis 22 and the horizon.

The trigonometric computational scheme is as follows. The distance to the primary target 14 and the value of the angle between the primary axis 22 and the horizon 20 allow computation of a given vertical distance 56 and horizontal distance 58. The sum of the two angles and the horizontal distance 58 allow computation of another given vertical distance 60. The difference between the two vertical distances 56 and 58 gives the desired result of vertical clearance 12, which is displayed via the eyepiece optics 32 in window 62.

Figure 4:
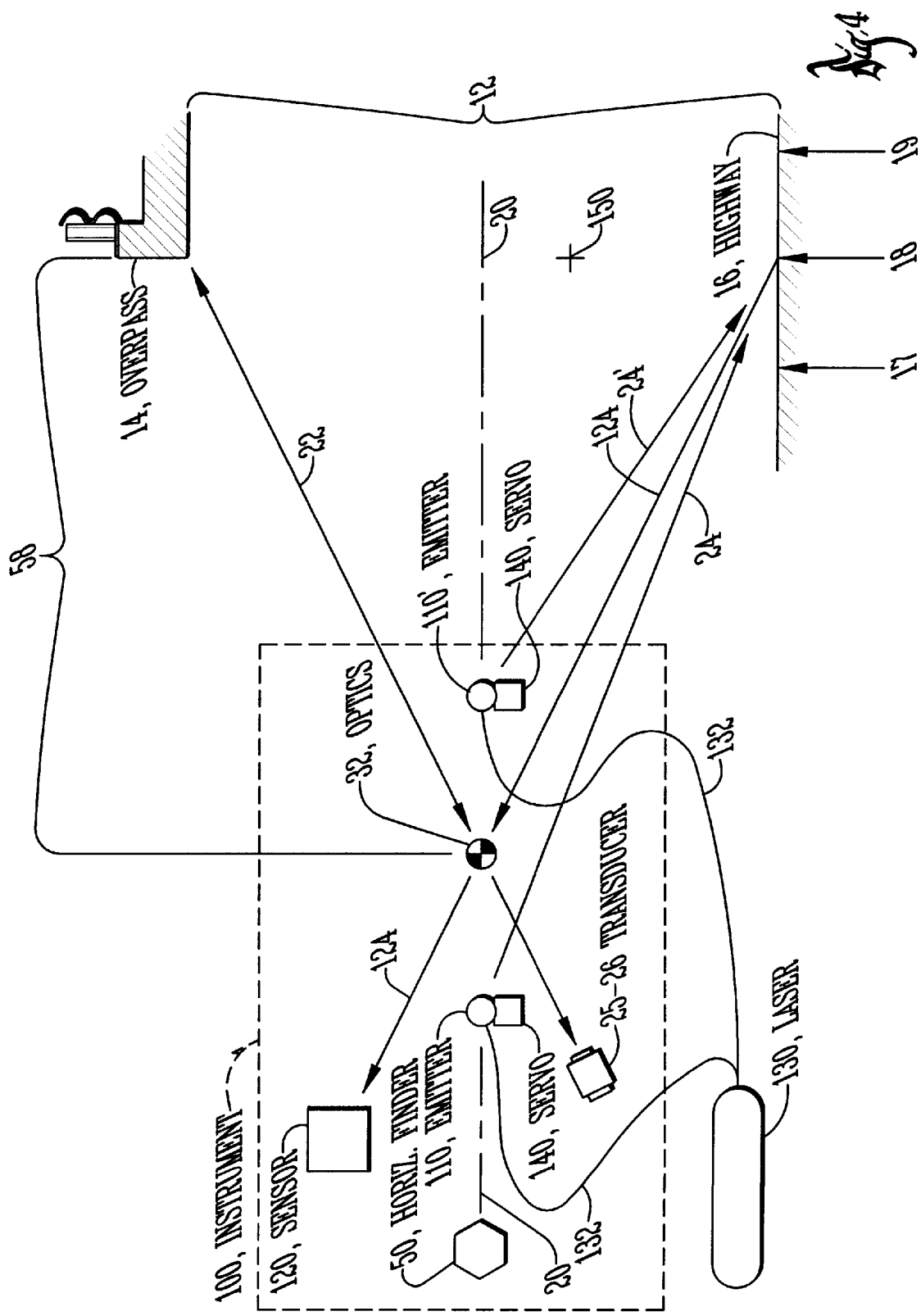
FIG. 4 is a view comparable to FIG. 3 except showing an alternate version of the instrument in accordance with the invention; and, FIG. 5 is a view comparable to FIG. 4 except showing another version of the inventive instrument.

FIG. 4 shows an alternate version 100 of the instrument in accordance with the invention. An inventive aspect here relates to the method by which elevational angle for the secondary axis 24 through target point 18 is determined.

The instrument 100 includes two laterally spaced projectors 110 and 110' of laser beams and a single sensor 120 to sense scattered-back radiation 124 from the projectors. In effect, the projectors 110 and 110' project not a single secondary axis 24, but convergent rays or axes 24 and 24' that intersect at the target spot 18. The projectors 110 are locked in a control loop to tilt in unison such that the convergent secondary axes 24 and 24' define substantially equal and identical elevational angles relative to the horizontal datum 20. Therefore, the elevational angle given by one projector 110 ought to be substantially equal and identical to the elevational angle of the other 110'.

The projectors 110 preferably comprise mirror galvanometers. The galvanometers are mounted horizontally such that a control signal or current causes the mirrors (which are not shown due to scale) to fold the beams tilted up or down as desired along various angles of inclination or declination. The activating current is proportionate to the projected beam 24's angle or declination (or inclination), and hence the actual current value that corresponds to when the beams 24 are correctly targeted, is therefore used in the computational scheme to compute the pertinent elevational angle for axes 24 and/or 24'.

A single laser 130 can supply the beams 24 for both projectors if the laser 130's output is split by a suitable beam splitter (not shown). Preferably the laser 130 will be relatively powerful because only a fractional amount of incident radiation 124 will be scattered back from the target spot 18 due to the low angle of attack of the beams 24 and 24' on the under-passing highway 16. For portability's sake, the laser 130 can be contained in a separate housing worn on the belt or in a backpack on the user. The laser's output can be piped into the instrument 100 via a flexible optical cable 132 or the like.

The sensor 120 preferably comprises a two-axis position sensor. By way of background, relatively large area photodiodes can be configured for linear position sensing. Whereas a single axis device is usually a long strip detector, a two axis device is normally square. In a single axis device, there is a common terminal in the middle of the strip and there are also two signal terminals, one at each end. When a scattered back beam (e.g., 124) is directed on the sensor, the relative output current from each signal terminal depends on how close the beam is the terminal. That way, the linear position of the beam on the sensor can be determined. In a two-axis sensor, the relative x-y location of the beam can be determined within the square "sensor" area of the sensor. The sum of the output currents from the signal terminals is proportionate to light intensity.

The FIG. 4 version 100 of the instrument further includes servo-motors 140 for turning turntables (not shown because of reduced scale) on which are rested the mirror galvanometers 110. The mirror galvanometers 110 are thus capable of slewing (or horizontally pivoting) their projected beams 24.

In use, operation of the FIG. 4 instrument 100 occurs as follows. The instrument 100 operates comparably as the FIGS. 1–3 version 10 in terms of (i) finding the range 22 of the bridge overpass 14, (ii) generating a data signal proportionate to the horizontal datum 20, (iii) generating another data signal proportionate to the elevational angle between the primary axis 22 and horizontal datum 20, all in order to compute true horizontal distance 58 between the instrument 100 and the bridge overpass 14.

The foregoing aside, the FIG. 4 version 100 includes inventive aspects as follows. Activation of the ON switch (e.g., 52 in FIG. 2) causes the dual projectors 110 and 110' to start seeking and finding the target spot 18. This process is controlled by the processing circuitry (e.g., 28 in FIG. 2).

The logic supporting the seeking and finding process starts with one given quantity, namely, the true horizontal distance 58. The servomotors 140 slew the mirror galvanometers 110 to a start position. The start position is predetermined as the position for the mirror galvanometers 110 in which until their respective beams 24 intersect each other at location 150, which is at the exact distance 58 out in front of the apparatus, and is also some given distance below the bridge overpass 14. Thus location 150 has two components. A calculated component which is horizontal distance 58, and a stored or pre-coded component which is the vertical drop below the bridge overpass 14. The stored or pre-coded drop value might be seven feet (2 m) or so, which might start location 150 about midway between the overpass 14 and highway 16 if the average expected clearance 12 is presumed to be around fourteen feet (4 m) or so. Regardless, the vertical drop can be reckoned and adjusted as desired according to use.

After the start position 150 has been found, the servomotors 140 and galvanometers 110 are simultaneously driven to start seeking the target spot 18. The beams 24 and 24' are persistently kept intersecting at distance 58 regardless of relative declination. The only place the two beams 24 and 24' will together train or focus on a single spot on the pavement 16 is at the exact spot 18 vertically down from overpass 14. The tilt of the galvanometers is controlled by a feedback algorithm dependent on the sensor 120's output. A person having ordinary skill can be reckon that if the two beams 24 and 24' are aimed too low (e.g., at intersection 17), then the beams 24 and 24' will reflect back two spots to the left and right of each other (not illustrated). It can also be reckoned that if the two beams 24 and 24' are aimed too high (e.g., at intersection 19), they will again reflect back two spots to the left and right of each other (again not shown, although in this case the beams 24 and 24' will have crossed each other in front of 19 at distance 58 above 18). The quality of the data signal generated by the two-axis sensor 120 will allow detection of the condition when the beams 24 and 24' are focused on target spot 18 because, (i) the y-axis signal currents will divulge the occurrence of a collimated spot on the central axis of the "sensor" area, and, (ii) the current intensity will be maximized. Continued sweeping of the crossing beams 24 and 24' up and down over the target spot 18 coupled with monitoring the signal from the sensor 120 will ultimately result in their stationary convergence on target spot 18. The pertinent elevational angle is computed from the galvanometer(s) 110's input current. At last enough variables are "known" to allow computation of vertical clearance 12, in accordance with what has been previously described with reference to FIG. 3.

Figure 5:
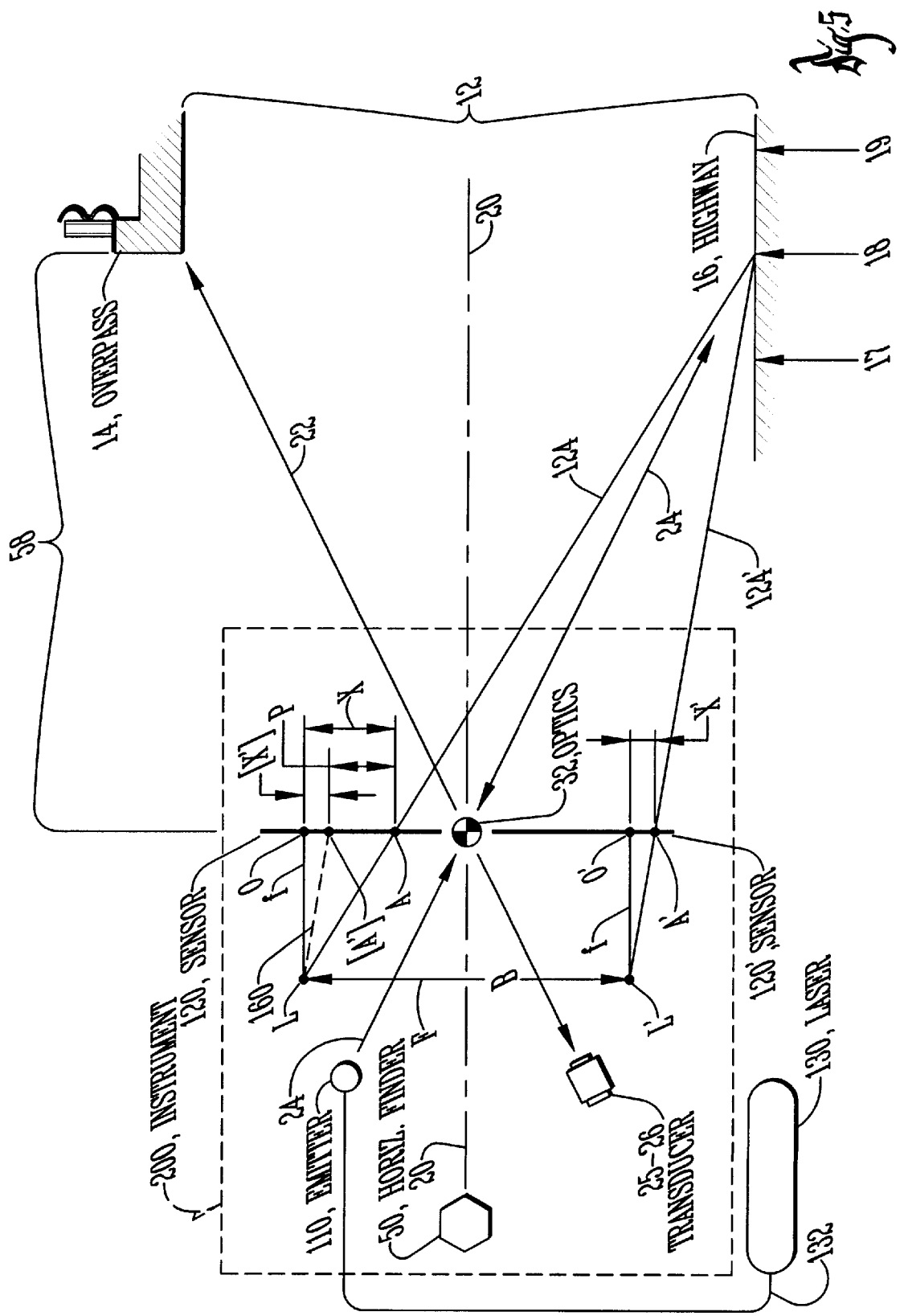

FIG. 5 shows a variation on FIG. 4. The FIG. 5 version 200 of the instrument in accordance with the invention has a single laser beam projector 110 and opposite linear position sensors 120 and 120' mounted fixed above and below each other in order to sense scattered back radiation 124 and 124' from the projector 110. These sensors 120 and 120' effectively give the instrument 200 stereoscopic vision except that, instead of the "eyes" being located spaced left and right of each other as human eyes are, the sensor "eyes" O and O' are located one on top of the other. This gives the sensors 120 and 120' increased (relative to a lateral mounting) depth acuity for the spot 18 on the pavement, given the low angle of viewing.

Comparably as in FIG. 4, the laser projector 110 preferably comprises a mirror galvanometer folding laser light supplied by a remote 130 laser to project a given beam 24. The input current will be proportionate to the elevational angle for beam 24. The operating principle that supports this instrument 200 is the well-known parallax equation, as typical for figuring data results for stereoscopic viewers of a given target, as is used in the field of photogrammetry (e.g., aerial surveying as by taking overlapping photographs with twin cameras and then analyzing and evaluating the taken photographs through a stereoscope).

The parallax equation goes as follows. The spaced sensors 120 and 120' are spaced by a base distance B. The scattered back radiation 124 and 124' is incident upon the respective sensors 120 and 120' at object image locations A and A' relative to object view centers O and O'. If the axes 124 and 124' are projected rearwardly behind the object planes O and O' of the sensors to the focal plane F, then they will intersect the focal plane F at points L and L' by the focal distance f behind the object planes O and O'. The parallax distance P is the difference of (i) the difference X between O and A, and (ii) the difference X' between O' and A'. These differences X and X' are each directly proportionate to the respective output currents for the signal terminals of the photo-diode sensors 120 and 120' respectively (wherein the respective common terminals are located at O and O' respectively).

An imaginary triangle 160 can be constructed having a base equal to the parallax value P, which is the difference between X and transposed [X]', and a height equal to the focal length f. The value [X]' is the transposed value X' from transposed point [A]' moved over onto object plane O. It be easily reckoned that triangle A–[A]'–L is proportionate to L–L'–18. Accordingly, the ratio of P to by f is equal to the ratio of B to [f+distance 58], or:

$$P/f = B/[f + \text{distance } 58].$$

The values for B and f are fixed and known. The distance 58 is computable, as described above with reference to the FIGS. 1–3 version of the instrument, by the steps of (i) finding the range 22 of the bridge overpass 14, (ii) generating a data signal proportionate to the horizontal datum 20, (iii) generating another data signal proportionate to the elevational angle between the primary axis 22 and horizontal datum 20, all in order to compute true horizontal distance 58 between the instrument 100 and the bridge overpass.

Finding target point 18 becomes relatively easy. The projector 110 will be sighted on the correct target point 18 for any given distance 58 whenever the parallax equation obtains this equality:

$$P = B \cdot f / [f + \text{distance } 58].$$

Therefore, the galvanometer 110 is swept continuously across the target point 18 while the output of the sensors 120 and 120' is evaluated until the projector beam 24 can be brought stationery upon the target point 18. The pertinent elevational angle is computed from the galvanometer 110's input current. Hence, sufficient variables are "known" to solve for vertical clearance 12.

The invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

I claim:

1. An apparatus for determining an elevational clearance delimited between an upper border and a lower border, said apparatus comprising:

range-signaling means for generating a data signal correlatable to a true range between a base point of said apparatus, and, one of the upper and lower borders, the range-signaling means including a radiation emitter and receiver for emitting radiation and receiving reflections of the emitted radiation, respectively;

optical means for optically aiming the radiation emitter at said one of the upper and lower borders along a given line that extends between the base point and the said one of the upper and lower borders;

level-signaling means for generating a data signal correlatable to a given horizontal datum;

angle-encoding means for encoding a data signal correlatable to an elevational angle between the horizontal datum and the given line;

axis-finding signaling means for finding an axis that extends between the base point and the other of said upper and lower borders, as well as, for generating a data signal correlatable to an elevational angle defined between the axis and the horizontal datum; and, processing means for processing the various data signals to output a message signal which can be decoded as the computed vertical clearance between the upper and lower borders;

wherein the axis-finding signaling means comprises an optical assembly including a reticle, an adjustable cross-hair, and manual controls to allow manual finding of said axis.

2. An apparatus for determining an elevational clearance delimited between an upper border and a lower border, said apparatus comprising:

range-signaling means for generating a data signal correlatable to a true range between a base point of said apparatus, and, one of the upper and lower borders, the range-signaling means including a radiation emitter and receiver for emitting radiation and receiving reflections of the emitted radiation, respectively;

optical means for optically aiming the radiation emitter at said one of the upper and lower borders along a given line that extends between the base point and the said one of the upper and lower borders;

level-signaling means for generating a data signal correlatable to a given horizontal datum;

angle-encoding means for encoding a data signal correlatable to an elevational angle between the horizontal datum and the given line;

axis-finding signaling means for finding an axis that extends between the base point and the other of said upper and lower borders, as well as, for generating a data signal correlatable to an elevational angle defined between the axis and the horizontal datum; and, processing means for processing the various data signals to output a message signal which can be decoded as the computed vertical clearance between the upper and lower borders;

wherein the axis-finding signaling means comprises dual laterally-spaced projectors of radiation beams, a sensor for detecting scattered back radiation of the projectors, and a controller, and wherein the projectors are mounted for control and are controllable by the controller for relative slewing and tilting of the projectors such that their respective beams intersect at a given target spot on said other of the upper and lower borders.

3. The apparatus of claim 2, wherein the controller is coupled to the sensor and includes servo-control processing capability which, based on a given quality of the scattered back radiation sensed by the sensor, controls the projectors to move and seek the given target spot.

4. An apparatus for determining an elevational clearance delimited between an upper border and a lower border, said apparatus comprising:

range-signaling means for generating a data signal correlatable to a true range between a base point of said apparatus, and, one of the upper and lower borders, the range-signaling means including a radiation emitter and receiver for emitting radiation and receiving reflections of the emitted radiation, respectively;

optical means for optically aiming the radiation emitter at said one of the upper and lower borders along a given line that extends between the base point and the said one of the upper and lower borders;

level-signaling means for generating a data signal correlatable to a given horizontal datum;

angle-encoding means for encoding a data signal correlatable to an elevational angle between the horizontal datum and the given line;

axis-finding signaling means for finding an axis that extends between the base point and the other of said upper and lower borders, as well as, for generating a data signal correlatable to an elevational angle defined between the axis and the horizontal datum; and, processing means for processing the various data signals to output a message signal which can be decoded as the computed vertical clearance between the upper and lower borders;

wherein the axis-finding signaling means comprises a projector of a radiation beam mounted for controllable tilting, dual vertically spaced position sensors sensitive to scattered back radiation of the projector, and a controller, and, wherein the projector's relative tilt is controllable by the controller such that the radiation beam lands upon a given target spot on said other of the upper and lower borders.

5. The apparatus of claim 4, wherein the controller is coupled to the sensors and includes servo-control processing capability which, based on a given quality of the scattered back radiation sensed by the sensors, controls the projector to tilt and seek the given target spot in accordance with a parallax equation computational scheme.

* * * * *